Jan. 10, 1939. I. ELLIOTT 2,143,412
STABILIZER FOR BAKING OVEN TRAYS
Filed April 27, 1937 2 Sheets-Sheet 1
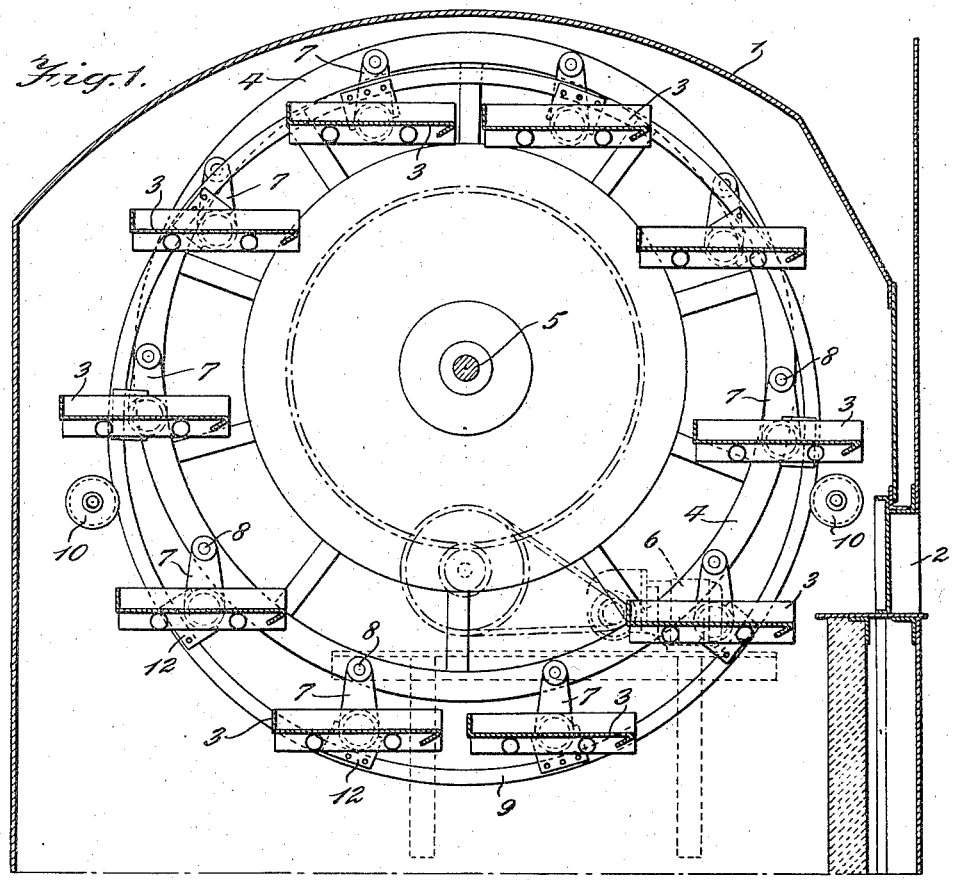
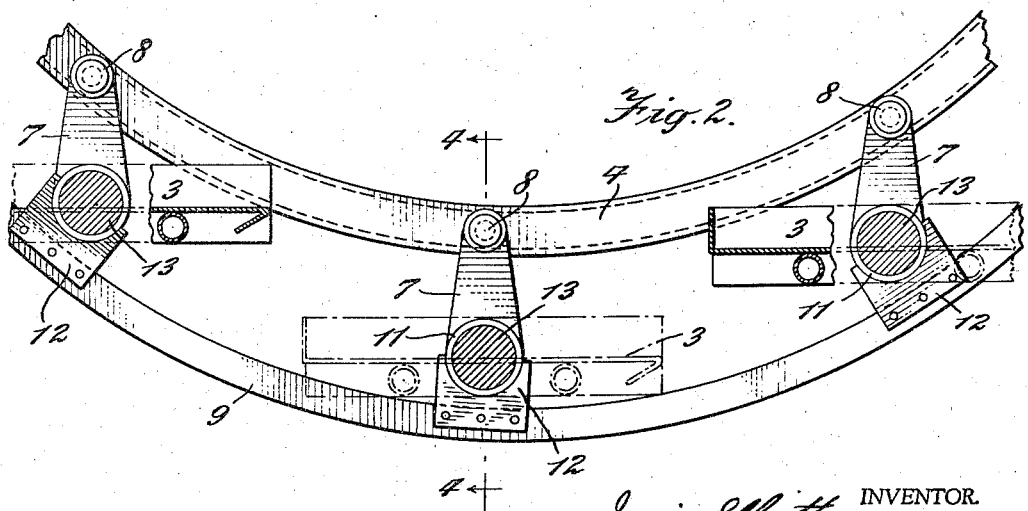
INVENTOR.
Irwin Elliott
BY
Gifford, Scull & Burgess
ATTORNEYS.

Jan. 10, 1939.  I. ELLIOTT  2,143,412
STABILIZER FOR BAKING OVEN TRAYS
Filed April 27, 1937  2 Sheets-Sheet 2

Irvin Elliott INVENTOR.
BY
Gifford, Scull & Burgess
ATTORNEYS.

Patented Jan. 10, 1939

2,143,412

UNITED STATES PATENT OFFICE 2,143,412

STABILIZER FOR BAKING OVEN TRAYS

Irwin Elliott, Harmon, N. Y., assignor to Universal Oven Company, Incorporated, New York, N. Y., a corporation of New York Application April 27, 1937, Serial No. 139,161

1 Claim. (Cl. 107—59)

This invention relates to a novel and improved form of stabilizer for baking oven trays the novel features of which will be best understood from the following description and the annexed drawings in which I have shown a selected embodiment of the invention and in which:

Fig. 1 is a vertical sectional view through an oven having my invention applied thereto this view being a section on the line 1—1 of Fig. 3;

Fig. 2 is a fragmentary view on an enlarged scale showing certain of the parts as appearing in Fig. 1 and showing other parts broken away to better illustrate the invention;

Figure 3:
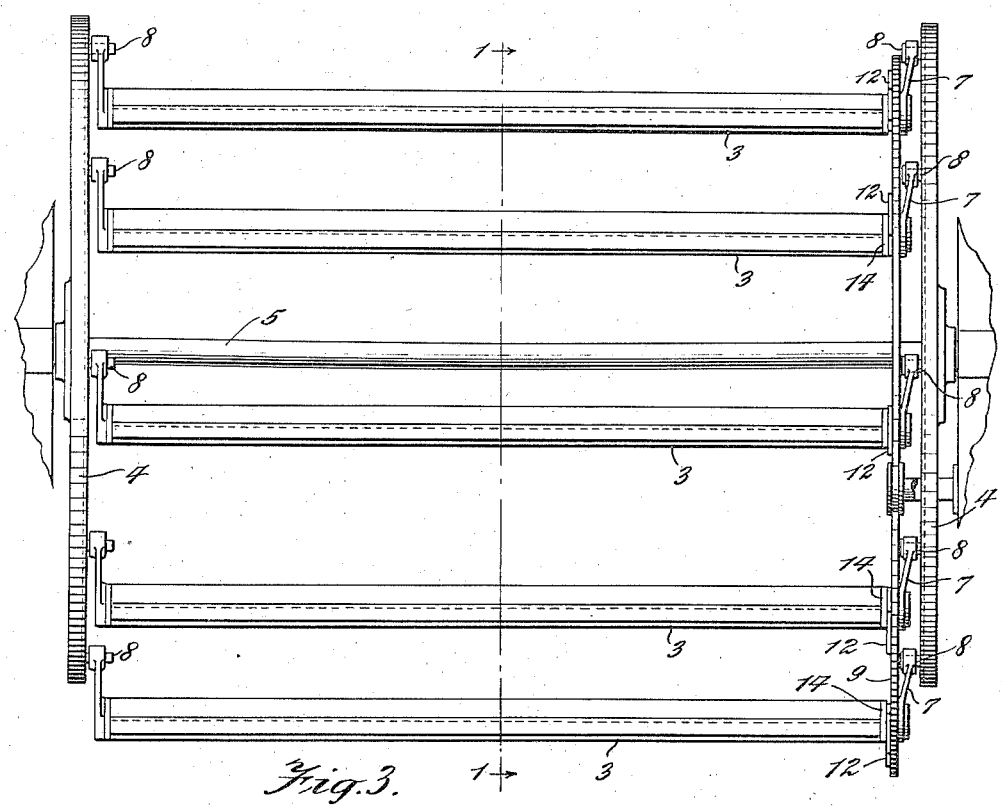
Fig. 3 is an elevation of the structure appearing in Fig. 1 as viewed from the right of Fig. 1, the oven casing being omitted.

The invention is shown and will be described in connection with a baking oven of the type used for baking articles of food, although it is to be understood that the invention may be used wherever found applicable. For the purpose of illustration, I have indicated a casing 1 of a baking oven having a door 2 through which articles of food may be inserted on the trays 3. These trays are mounted upon a rotary structure consisting of two rotary wheels 4 rotatable about a common axis and in fact shown as mounted upon a common shaft 5. This shaft may be rotated by means of a motor 6 through a driving connection indicated in dot and dash lines in Fig. 1, but the details of which are not important to an understanding of the invention and so will not be described.

The trays 3 are supported upon the rims of the two wheels 4 by means of hangers 7. Preferably, the hangers are all of equal length, and a pair of hangers is supplied for each tray, one hanger at each end of the tray being pivoted at 8 to the wheel at that end. The trays are rigid with the hangers and thus may swing freely from the wheels 4 so as to be level in all positions of the wheels.

Figure 5:
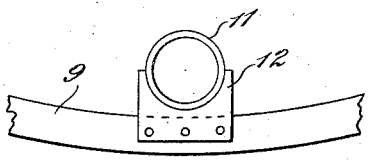
Fig. 5 is a detailed view of one of the bearings.
Figure 4:
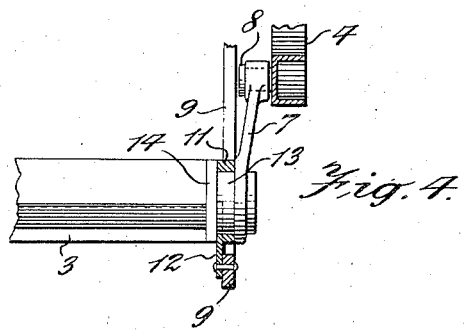
Fig. 4 is a view approximately on the line 4—4 of Fig. 2.

In order to maintain them in this level position, however, a stabilizer ring 9 is provided which is truly circular in the illustrated form, as are the wheels 4. The ring 9 is disposed eccentrically to the axis of the wheels 4 and is supported upon rollers 10 so that it may rotate freely. Upon the ring 9 are bearings 11, one for each tray, these bearings, as best shown in Figs. 4 and 5, being mounted in fixed position as by means of brackets or plates 12 secured to the ring. Each bearing is preferably cylindrical in form and disposed substantially in the same plane as the ring. This plane is within one of the wheels 4 and closely adjacent thereto and is such that each of the bearings 11 may engage a cooperating cylindrical bearing 13 at one end of a tray and between the end of that tray and the adjacent hanger 7.

By the above described arrangement it is possible to use a stabilizer ring with present structure of oven without increasing the outer dimension of the oven, the only alteration required in existing structure being a possibly slight decrease in the length of the tray so as to provide the space for the bearing between an end 14 of the tray and the adjacent hanger 7, and the slight change in form of the hangers adjacent the ring, so that the ring will clear the ends of the pivots 8. Such alterations are easily made without any great expense and no appreciable sacrifice of space, and, as a matter of fact, usually it is not necessary to decrease the length of the tray, as there is enough space between the conventional hanger and the tray end to provide a bearing for the ring.

It will be understood that the eccentricity of the stabilizer ring is such that the bearings 11 carried by the ring and which engage the bearings 13 will maintain the trays horizontal in all positions thereof. Stabilizer rings for this general purpose are known in the art, but the particular arrangement of the ring with respect to the other elements of the oven is believed to be novel. While I have shown the invention as embodied in a specific form, it is to be understood that various changes in details may be made without departing from the scope of the invention, as defined by the appended claim.

I claim:

In a baking oven, two rotary tray wheels rotatable about a common axis, a plurality of trays disposed between said wheels and supported thereon by hangers, one hanger at each end of each tray, said hangers being pivotally connected to the wheels and rigidly secured to the trays, bearings at the ends of said trays adjacent one of said wheels and disposed between the tray ends and the adjacent hangers, all of said bearings being disposed substantially in a common plane, a stabilizer ring eccentric to the axis of said wheels and disposed substantially in said plane, and bearings fixed on said ring and each rotatably engaging one of said first-named bearings, said hangers being of equal length and the eccentricity of said ring being such that said bearings maintain the trays horizontal in all positions thereof.

IRWIN ELLIOTT.